Oct. 22, 1940.　　　P. S. MADSEN　　　2,218,919

INFLATABLE BALL

Original Filed Aug. 26, 1933

Inventor
Paul S. Madsen

By Rockwell Bertholow
Attorneys

Patented Oct. 22, 1940

2,218,919

UNITED STATES PATENT OFFICE 2,218,919

INFLATABLE BALL

Paul S. Madsen, Bethany, Conn., assignor, by mesne assignments, to The Seamless Rubber Company, New Haven, Conn., a corporation of Connecticut Substitute for application Serial No. 686,963, August 26, 1933. This application June 29, 1937, Serial No. 150,923

5 Claims. (Cl. 273—65)

This invention relates to inflatable balls such as footballs, the present application being a substitute for my application Serial No. 686,963, filed August 26, 1933.

The invention has particular application to football bladders but it may be used in other connections. Football bladders of the flat or unmolded variety have the objection that they lack toughness and homogeneity and their walls are of varying thickness or strength at different points in the bladder so that when the bladder is inflated it is lopsided or out of round. Where, for example, the wall of the bladder is somewhat thinner in one locality than in others, the tendency is for the bladder to be distended unduly in that locality when air is pumped into the bladder so that the latter will not have the desired shape.

It has been proposed heretofore to provide bladders formed by molding, but such bladders are usually too heavy and not of one solid piece, and in many cases they have had weak places in their walls or places where the necessary resiliency was lacking. A structure of this kind is objectionable because it is obviously desirable to obtain the same action from the football when kicked at any point in its surface.

One of the objects of my invention is to overcome the above-mentioned defects.

Another object is to provide an improved inflatable ball and in particular an improved bladder structure for footballs and like balls.

To these and other ends the invention consists in the novel features and combinations of parts to be hereinafter described and claimed.

Figure 1:
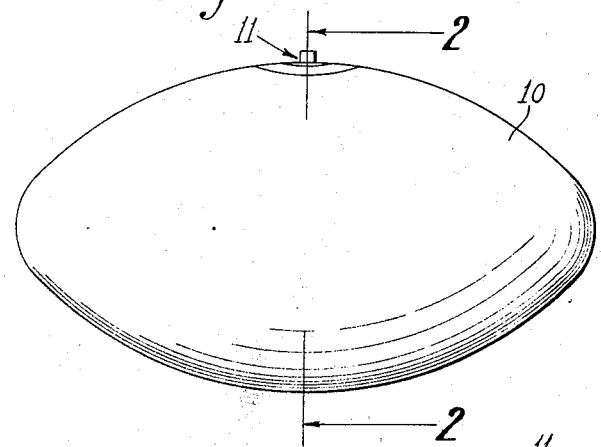
Fig. 1 is a side elevation of a football bladder constructed in accordance with my invention, the same being shown in the inflated condition.

In the drawing I have shown my improvements applied to a football of oval shape, but it is to be understood that the invention is applicable to footballs and other balls of spherical and other shapes.

Figure 2:
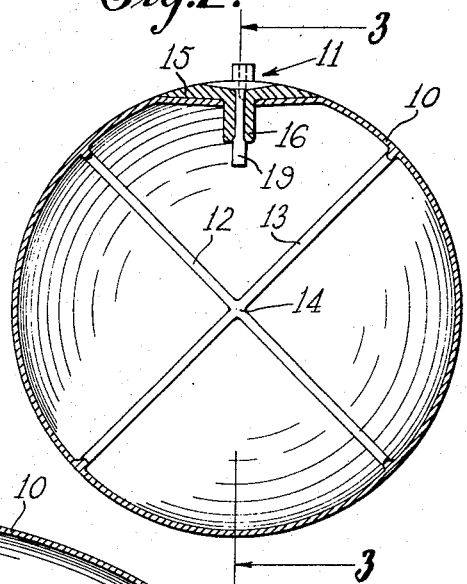
Fig. 2 is an enlarged section on line 2—2 of Fig. 1.
Figure 3:
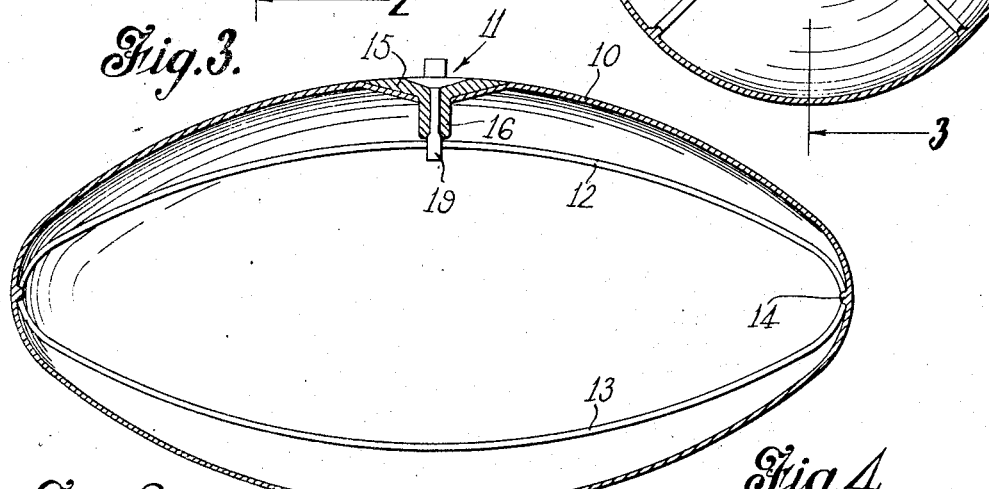
Fig. 3 is a longitudinal section of the bladder.
Figure 6:
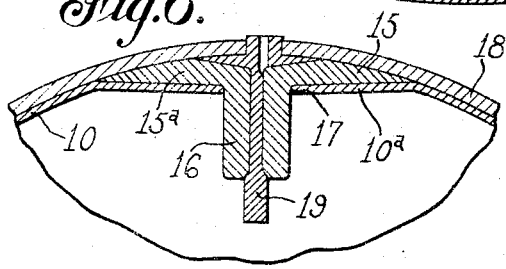
Fig. 6 is a view on a larger scale showing a portion of the case in which the bladder is enclosed.
Figure 7:
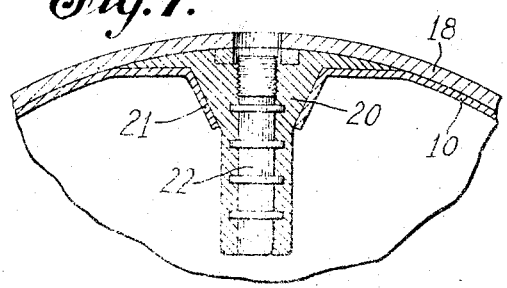
Fig. 7 is a view similar to Fig. 6, illustrating the use of a different type of valve.

In Figs. 1, 2 and 3 I have shown the bladder only, but in Figs. 6 and 7 the outer element or case is also shown. The bladder 10, shown by way of example in Figs. 1, 2 and 3, is a molded bladder of oval shape having at one side and midway of the length thereof an inflating valve indicated generally by reference character 11. The structure of the valve 11 may vary within wide limits without departing from the scope of my invention, as will hereinafter appear. The bladder is preferably made of a fairly heavy gauge of rubber and has on its inner surface a number of inwardly projecting reinforcing ribs which materially assist in maintaining the proper shape of the bladder when the latter is inflated. The arrangement of the reinforcing ribs may be considerably varied, but in the instance illustrated these ribs extend lengthwise of the oval bladder, there being in all two ribs, each lying in a single plane and intersecting the plane of the other rib. In this particular case the ribs intersect each other at an angle of 90°, but of course this is susceptible of modification. The ribs cross each other at the ends of the bladder, as shown particularly in Figs. 2 and 3. One of the ribs is indicated at 12 and the other at 13, and their points of intersection are indicated at 14. These points of intersection are at the tips or poles of the ball. The valve 11 is preferably located midway between rib 12 and rib 13, but this is not essential. The valve structure may comprise an outer tubular member 15, as shown particularly in Figs. 1, 2, 3 and 6. This tubular member has a thick attaching flange 15a secured to the outer face of the bladder wall, and the tubular member likewise comprises a tubular part 16 projecting interiorly into the bladder. The wall of the bladder is apertured, as shown more particularly at 17 in Fig. 6, the aperture being substantially of the same diameter as the tubular part 16, and the flange 15a being applied to the part 10a of the bladder wall around the aperture 17 with the part 16 projecting into the aperture.

In Fig. 6 the outer element or case of the football is shown at 18. This may be made of leather or other suitable material. Within the tubular member 15 is a suitable valve member. In the structure shown in Fig. 6 this valve member is indicated at 19 and is of the type shown in patent to C. J. Crowley, No. 2,011,562, issued August 20, 1935. Other types of inflating valves may, however, be used, and as one example of this I have shown in Fig. 7 a tubular member 20 attached to the apertured portion 21 of the bladder wall and equipped interiorly with a metal valve 22 of the Schrader type. The valve structure shown in Fig. 6 is adapted to be used in connection with an inflating needle, as described in the Crowley patent above mentioned, and the valve shown in Fig. 7 is adapted to be used in connection with an air hose having the usual threaded nipple on the end thereof.

Figure 4:
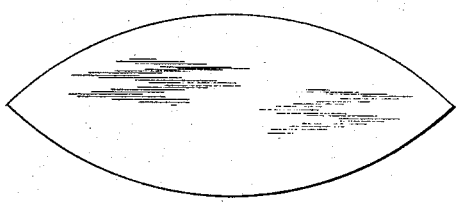
Fig. 4 shows a gore such as may be used in constructing the bladder.

In manufacturing a football structure such as described, I cut from uncured sheet rubber stock of the proper gauge a number of gores of the general shape shown in Fig. 4. The bladder shown in Figs. 1, 2 and 3 is made of four such gores, but I do not limit myself to any particular number. The gores of unvulcanized rubber are next joined together at their edges to form joints such as disclosed in Fig. 5. It will be observed from Fig. 5 that the meeting edge portions of adjacent gores are somewhat flanged, the edge portion of each gore being turned at approximately right angles to the body thereof. Thus the gores are stuck together over surfaces of greater width than the thickness of the gore bodies, and at the joints enlarged portions or ribs are provided. By securing the gores together edge to edge, a so-called biscuit is built up, and this biscuit is placed in a suitable mold and molded therein. In the operation of molding, which involves the use of heat and pressure, the adjacent gores are flowed together so as to make the ball of an integral or one-piece structure. As the gores are so joined, their parting lines are eliminated, and as a result each gore is in one piece with the gores on opposite sides of it, and in the zones where the gores merge together reinforcing ribs are produced which are in one piece with the ball wall without any line of division between said ribs and the ball wall or between different portions of the ribs. Preferably these ribs project inwardly with respect to the ball, as shown, and have rounded inner surfaces. The outer surface of the bladder conforms to the mold, which in this instance is oval, and thus the bladder is given the desired contour.

Vulcanization of the bladder or ball can be effected in any well-known or desired manner.

It will be observed that by my invention the ends of the ball can be very strongly constructed and the structure is very uniform in that the wall of the ball is of the same thickness substantially at the ends thereof as in other parts, and is at least as strong in those locations as in other parts. This is produced by having the gores extend completely to the ends of the ball and by having the wall portion of the ball between the reinforcing ribs of a uniform cross-section from one end or pole to the other end or pole. No patching of the ends is required. The ball is of the same cross-section across the tips or poles as in other parts of its wall.

Figure 5:
Fig. 5 is a detail showing the manner of forming the joints between the gores.
Figure 2A:
Fig. 2A is a view on a considerably enlarged scale of a portion of Fig. 2.

The joints between the gores are especially strong and durable inasmuch as the material of two adjacent gores not only flows together and unites over the normal thickness of the gores, but over a considerable area in addition to that, owing to the flanged condition of the gore edges, as shown more particularly in Fig. 5. Thus I provide an especially strong joint between the gores which is not likely to open up even under the hardest usage, and the rib-like reinforcements are of material assistance in maintaining the desired uniform inflation of the different parts of the ball.

It will be noted that the ribs which extend across the poles in different planes are of substantial depth in relation to the thickness of the wall stock, and in the form shown are of a depth approximately equal to the thickness of the wall stock, each having a convex inner surface, these ribs being integral parts of a one-piece bladder preshaped in all portions thereof to correspond in contour to the adjacent portions of the enclosing case. The bladder also comprises as an integral part thereof, as shown an inwardly extending elastic inflating-valve-carrying structure located between certain of the ribs and having a part flush with the body whose outer surface is curved in conformity to the curvature of the molded body wall.

Various changes can be made in the details of structure without departing from my invention as defined in the claims. I have not attempted to illustrate or describe the various forms and modifications which may be utilized within the broad principles of my invention.

What I claim is:

1. A football or like ball for use in athletic contests having a relatively stiff case and an inner relatively thin elastic inflatable bladder, said bladder comprising a one-piece molded and vulcanized collapsible body having a dense homogeneous wall preshaped in all portions thereof to correspond in contour to the adjacent portions of the enclosing case, said body having integral interior meridian ribs in different planes extending across the poles, and likewise comprising as a part thereof an elastic inflating-valve-carrying structure associated with the wall between certain ribs and provided with a valve accessible from the exterior of the case.

2. A football or like ball for use in athletic contests having a relatively stiff case and an inner relatively thin elastic inflatable bladder, said bladder comprising a one-piece molded and vulcanized collapsible body having a dense homogeneous wall preshaped in all portions thereof to correspond in contour to the adjacent portions of the enclosing case, said body having narrow integral interior ribs extending across the poles in different planes, the portions of the wall between the ribs being of uniform thickness substantially throughout the body, and said body being provided between certain ribs with an inwardly extending integral elastic inflating-valve-carrying structure provided with a valve accessible from the exterior of the case.

3. A bladder for footballs and like balls used in athletic contests, said bladder comprising a one-piece molded and vulcanized collapsible body having a thin but dense homogeneous elastic wall requiring external support when inflated and preshaped in all portions thereof to correspond in contour to the adjacent portions of the enclosing case, said body having integral interior ribs extending across the poles in different planes, said ribs being of substantial depth in relation to the thickness of the wall stock, the portions of the wall between the ribs being of uniform thickness substantially throughout the body including the portions adjacent the poles, and said body comprising as an integral part thereof an elastic inflating-valve-carrying structure located between certain of said ribs.

4. A bladder for footballs and like balls used in athletic contests, said bladder comprising a one-piece molded and vulcanized exteriorly smooth collapsible body having a thin but dense homogeneous elastic wall requiring external support when inflated and preshaped in all portions thereof to correspond in contour to the adjacent portions of the enclosing case, said body having integral interior ribs extending across the poles in different planes, said ribs being of a depth approximately equal to the thickness of the wall stock and each having a convex inner surface, the portions of the wall between the ribs being of uniform thickness substantially throughout the body including the portions adjacent the poles, and said body comprising as an integral part thereof an inwardly extending elastic inflating-valve-carrying structure located between certain of said ribs, and having a part flush with the body whose outer surface is curved in conformity to the curvature of the molded body wall.

5. A bladder for footballs and like balls comprising a one-piece molded and vulcanized collapsible body having a thin but dense homogeneous elastic wall requiring external support when inflated and pre-shaped in all portions thereof to correspond in contour to the enclosing case, said body having integral interior ribs of substantial depth in relation to the wall thickness defining gore-like portions and crossing the poles.

PAUL S. MADSEN.